US012794960B2

(12) United States Patent
Bhamidipati et al.

(10) Patent No.: US 12,794,960 B2
(45) Date of Patent: *Nov. 10, 2026

(54) REDUCING SETUP TIME FOR ONLINE MEETINGS

(71) Applicant: Microsoft Technology Licensing, LLC, Redmond, WA (US)

(72) Inventors: Nagaswapna Bhamidipati, Redmond, WA (US); Xin He, Bellevue, WA (US); Milica Jovanović, Prague (CZ); Artur Pawel Kania, Bellevue, WA (US); Namendra Kumar, Redmond, WA (US); Rui Liang, Sammamish, WA (US); Yue Li, Bellevue, WA (US); Joel Harodi Marquez Catano, Seattle, WA (US); Abhilash Chandrasekharan Nair, Bothell, WA (US); Gaurav Pancholi, Redmond, WA (US); Jindrich Parus, Prague (CZ); Martin Petrla, Prague (CZ); Denis Postu, Prague (CZ); Rama Krishan Prasad Satya Prakash, Redmond, WA (US); Kensaku Sueda, Kirkland, WA (US); Balvinder Kaur Thind, Sammamish, WA (US); Hao Xu, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 233 days.

This patent is subject to a terminal disclaimer.

(21) Appl. No.: 18/829,092

(22) Filed: Sep. 9, 2024

(65) Prior Publication Data

US 2024/0430315 A1 Dec. 26, 2024

Related U.S. Application Data

(63) Continuation of application No. 18/436,955, filed on Feb. 8, 2024, now Pat. No. 12,212,615, which is a (Continued)

(51) Int. Cl.

*H04L 65/403* (2022.01)
*G06Q 10/109* (2023.01)

(Continued)

(52) U.S. Cl.

CPC ......... *H04L 65/403* (2013.01); *G06Q 10/109* (2013.01); *H04L 12/1831* (2013.01); *H04L 65/1069* (2013.01)

(58) Field of Classification Search

CPC ............... H04L 65/403; H04L 65/1069; H04L 12/1831; G06Q 10/109

See application file for complete search history.

(56) References Cited

PUBLICATIONS

Notice of Allowance mailed on Sep. 16, 2024, in U.S. Appl. No. 18/436,955, 07 pages.

*Primary Examiner* — Blake J Rubin

(74) *Attorney, Agent, or Firm* — NovoTechIP International PLLC

(57) ABSTRACT

An online meeting system begins the process of connecting a user to an online meeting when a request is received from a user to start or join the online meeting. In response to the request, a pre-meeting user interface (UI) is displayed having a user interface control which, when activated, enables transmission of audio and/or video data for the online meeting, and prior to activation of the control, connection parameters are shared with an online meeting service to preheat the meeting. In response to activation of the control, transmission of audio and/or video data for the online meeting is enabled.

15 Claims, 6 Drawing Sheets

Related U.S. Application Data continuation of application No. 18/168,374, filed on Feb. 13, 2023, now Pat. No. 11,916,983, which is a continuation of application No. 17/576,243, filed on Jan. 14, 2022, now Pat. No. 11,582,275, which is a continuation of application No. 16/702,533, filed on Dec. 3, 2019, now Pat. No. 11,252,206.

(51) Int. Cl.

| | |
|---|---|
| ***H04L 12/18*** | (2006.01) |
| ***H04L 65/1069*** | (2022.01) |

REDUCING SETUP TIME FOR ONLINE MEETINGS

CROSS-REFERENCE TO RELATED APPLICATIONS

This application is a continuation of U.S. patent application Ser. No. 18/436,955, filed Feb. 8, 2024, which is a continuation of U.S. patent application Ser. No. 17/576,243 filed on Jan. 14, 2022, and issued on Feb. 27, 2024 as U.S. Pat. No. 11,916,983, which is a continuation of U.S. patent application Ser. No. 16/702,533, filed on Dec. 3, 2019 and issued on Feb. 15, 2022 as U.S. Pat. No. 11,252,206, all of which are incorporated by reference herein in their entirety.

TECHNICAL FIELD

The present application relates generally to a meeting connection service, and in particular to systems and methods for connecting users to meetings with a shorter perceived wait time.

BACKGROUND

As videoconferencing technology matures, workers are increasingly conducting meetings electronically (whether by video or audio). Electronic meeting spaces (such as those available through Microsoft Teams®) provide convenient structure for workers to converse and to share documents with one another without having to meet physically, allowing a physically dispersed workforce to collaborate effectively. These spaces typically allow users to meet via establishing meeting channels to which users are joined. The wait time to join a channel is typically at least three seconds and can be as much as twenty seconds, which can be frustrating for users, particularly when the user joining the meeting can see and hear participants in an ongoing meeting but cannot actually communicate with them yet. There is thus a technical need for a system for joining online meetings that reduces setup time, or at least reduces perceived setup time.

SUMMARY

In one aspect, an online meeting system has a two-phase connection process for an online meeting, the two-phase connection process including (i) a pre-meeting phase during which a data communication channel is established for the online meeting and there is no flow of audio or video data for the online meeting through the data communication channel, the pre-meeting phase being initiated in response to a pre-meeting signal, and (ii) a meeting established phase during a flow of audio and/or video data for the meeting is enabled, the online meeting system, the meeting established phase being initiated in response to receiving a join signal, and includes a processor; and a memory in communication with the processor, the memory comprising executable instructions that, when executed by the processor alone or in combination with other processors, cause the online meeting system to perform acts. The acts include receiving a client pre-meeting signal from an online meeting application being executed on a client computer, the client computer being associated with a first user, the client pre-meeting signal including at least one client connection parameter for an online meeting service to use in establishing the data communication channel with the online meeting application for the online meeting; and, in response to receiving the client pre-meeting signal and prior to receiving a join signal from the online meeting application indicating that the first user has selected a join meeting control in the online meeting application: sending a service pre-meeting signal to the online meeting application, the service pre-meeting signal including at least one service connection parameter for the online meeting application to use in establishing the data communication channel with the online meeting service for the online meeting; establishing, using the at least one client connection parameter and the at least one service connection parameter, the data communication channel for transmitting audio and video data for the online meeting to or from the online application; and after the data communication channel has been established, suppressing flow of information via the data communication channel; and in response to receiving the join signal after the data communication channel has been established, enabling transmission of the audio and video data for the online meeting to and from the online application via the data communication channel.

In another aspect, an online meeting system has a two-phase connection process for an online meeting, the two-phase connection process including (i) a pre-meeting phase during which a data communication channel is established for the online meeting and there is no flow of audio or video data for the online meeting through the data communication channel, the pre-meeting phase being initiated in response to a pre-meeting signal, and (ii) a meeting established phase during a flow of audio and/or video data for the meeting is enabled, the online meeting system, the meeting established phase being initiated in response to receiving a join signal, and includes a processor; and a memory in communication with the processor, the memory comprising executable instructions that, when executed by the processor alone or in combination with other processors, cause the online meeting system to perform acts. The acts include receiving first user input via a user interface of an online meeting application, the first user input indicating that a user is interacting with settings for an online meeting; receiving second user input via the user interface indicating that the user has selected a join meeting control of the user interface; in response to receiving the first user input and prior to receiving the second user input: sending a client pre-meeting signal to an online meeting service, the client pre-meeting signal including at least one client connection parameter for the online meeting service to use in establishing a data communication channel with the online meeting application for the online meeting; receiving a service pre-meeting signal from the online meeting service, the service pre-meeting signal including at least one service connection parameter for the online meeting application to use in establishing the data communication channel with the online meeting service for the online meeting; receiving a preheated meeting established signal indicating that the data communication channel has been established successfully; and suppressing flow of audio and video data from the online meeting application to the online meeting via the data communication channel; and, in response to receiving the second user input after receiving the preheated meeting established signal: sending a join meeting signal to the online meeting service; receiving a connection established signal from the online meeting application, the connection established signal indicating that the data communication channel is established; and in response to receiving the connection established signal, enabling transmission of the audio and video data from the online meeting application to the online meeting via the data communication channel.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Modern computer users frequently are called upon to meet online, rather than face-to-face or over the telephone, for example because they are geographically separated or because it is more convenient to work on documents together when both parties are at their own computers. When starting an online meeting, it may typically take anywhere from 2-20 seconds to establish a connection. While this may seem to be a small amount of time, it can be frustrating for users, creating a technical problem that the user may already be frustrated by the wait when starting the meeting. Another technical problem is that the connection sequence may be arranged so that there is a period of time when a user joining an online meeting can see and hear the participants already in the meeting, but cannot be seen or be heard by them, which can be even more frustrating for the joining user. The systems and methods described herein provide a technical solution to these problems by changing the startup sequence, leveraging time that a user being added to an online meeting already spends interacting with a preferences screen. By the technical solution of beginning to establish data channels for the online meeting during this time, the perceived startup time before the user is able to see or hear others in the meeting can be reduced, providing a technical benefit of less frustration for the user.

Figure 1:
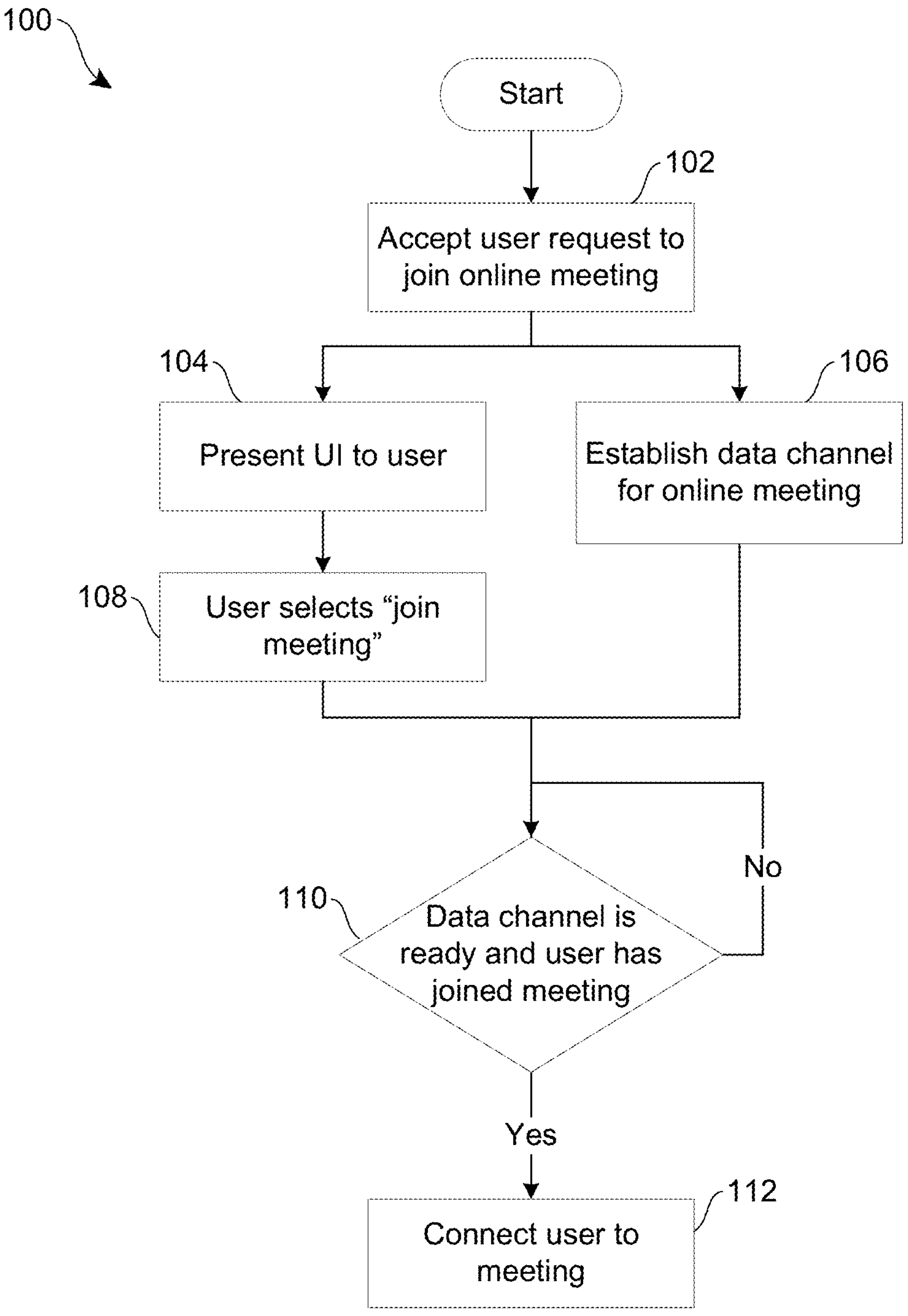
FIG. 1 is a flow chart describing the flow of preparing a meeting as seen by the online meeting system.

FIG. 1 is a process flow 100 showing a simple flow of setting up an online meeting as performed by an online meeting service. The process begins with a user requesting to join an online meeting (step 102). This request may occur, for example, in the context of an online collaboration and meeting tool like MICROSOFT TEAMS®, or any other suitable client for accessing an online meeting service. The user may, for example, choose one or more contacts to create an impromptu meeting, or may be joining a previously scheduled meeting. In response to receiving the request to join the meeting, the online meeting service directs the user's local client to present a user interface (UI) (step 104, seen below in FIG. 2) where the user can choose meeting settings for joining the online meeting. The meeting settings may include device settings, whether to transmit via audio and/or video, and video settings such as blur or a custom backdrop. The UI also may include a control for joining the online meeting, such as a clickable "join meeting" button.

While the user is viewing the UI and choosing settings, in one implementation, the meeting service may be establishing a data communication channel for the meeting (step 106). This step may include creating a new meeting if the user is not joining an existing meeting. The meeting service creates the meeting (if it does not already exist) and a "preheat" routing group where the user is placed, further discussed below in connection with FIG. 3 and FIG. 4. While the user is in the "preheat" routing group, media does not flow to or from the user and the user is not shown in the meeting roster, even though the online meeting service has connected them to the meeting.

When the user is done choosing settings in the UI, they choose the "join meeting" button (step 108). At this point, the meeting service knows that they definitely wish to join the meeting, but the data channel may not be established for use yet. If the data channel is not yet established (step 106), the user waits for completion of this step. The service checks (step 110) that the online meeting service has also finished establishing the data channel for the meeting (step 106), pausing at this point until both the user has chosen to join the meeting (step 108) and the data channel is ready (step 106). Once both steps are finished, the service proceeds to connect the user to the meeting (step 112). During the time before the service connects the user to the meeting in step 112, communication may be prevented from flowing from the user into the meeting or from the meeting to the user. If the user is not added to the meeting within a selected period of time, if the user navigates away from or dismisses the UI, or if the user is added to a different online meeting, the prepared media channel for connecting the user may be dismissed (see discussion of FIG. 4 below for more details).

Figure 2:
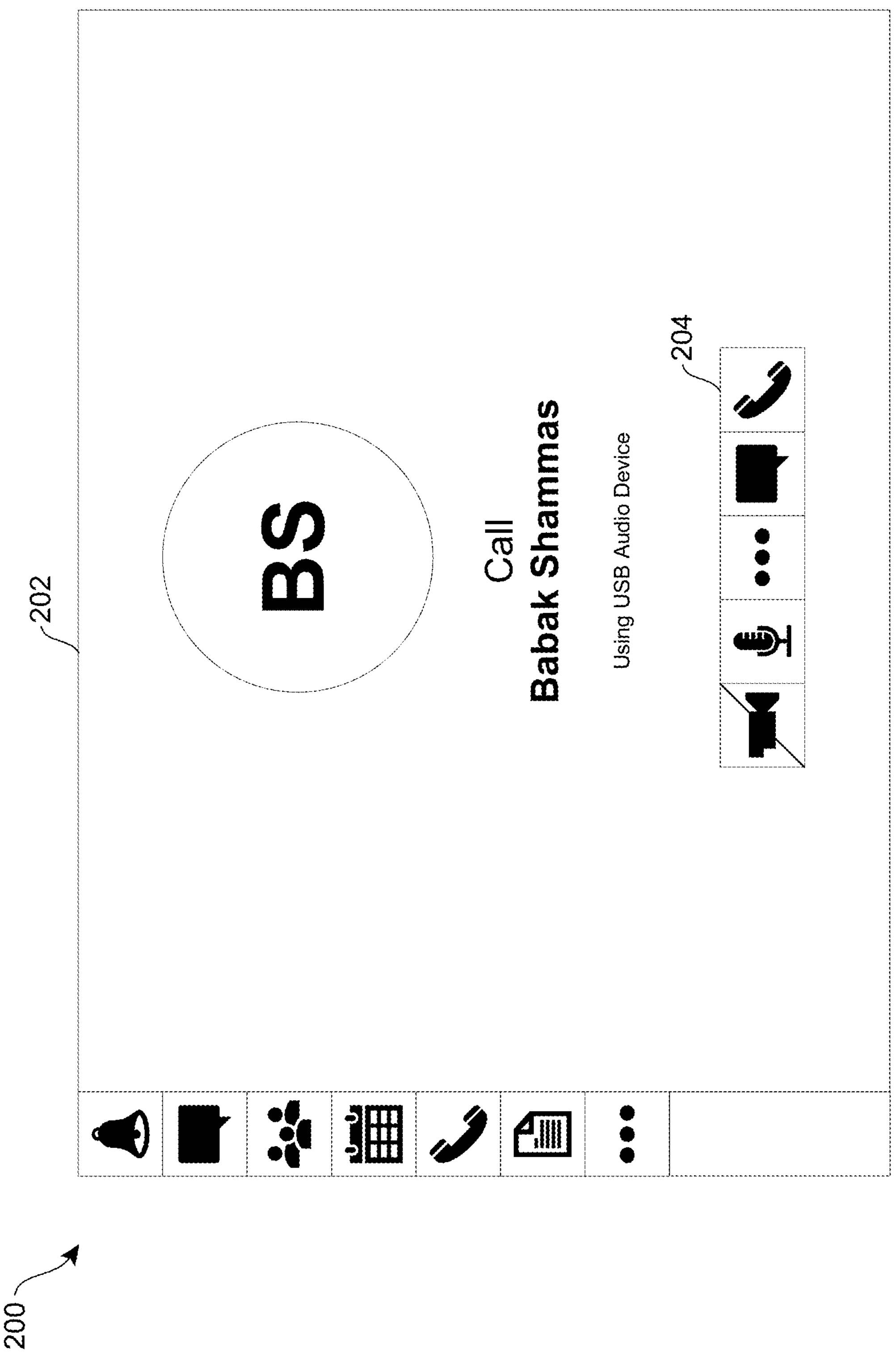
FIG. 2 is an illustration of a user interface for selecting preferences for an online meeting.

FIG. 2 shows a user interface 200 for an online meeting (e.g., a video conference or an audio call). As illustrated, the meeting is happening within the context of the MICROSOFT TEAMS® application running on a desktop computer, but it will be understood that the systems and methods described herein may work with any conferencing software (e.g., SKYPE®, SLACK®, or ZOOM®) on any appropriate platform (e.g., a desktop computer, a laptop computer, a notebook computer, a mobile phone, or a wearable device). The user has chosen to meet with Babak Shammas and is seeing a pre-meeting dialog 202 that allows the user to choose settings for the meeting. For example, in the illustration, the video is off (indicated by a diagonal line across the video camera icon) and the audio is on. Settings may also include, for example, a user display name, a user audio device, a user video device, a user microphone device, audio muting settings, video blur settings, and video backdrop settings. When the user is ready to start the meeting, he may click the "join meeting" icon 204, shown as a phone in FIG. 2. It will be understood that while a visual interface is shown in FIG. 2, it is also contemplated that the user could use an audio or other interface to start the meeting. While the user is interacting with the user interface 200, the local processor and/or the media processor are beginning the technical effect of setting up ("preheating") the meeting. As used herein, the term "preheating" an online meeting means beginning to establish a media channel for the meeting before the user is ready to connect, for example by exchanging client and service connection parameters between a client and a conversation service as described below in connection with FIG. 3 and FIG. 4. By performing this task while the user is still choosing preferences in the user interface 200, the system achieves the technical benefit of reducing the apparent time to join the meeting as seen by the user. Preliminary steps in setting up the connection of the user to the meeting occur while the user is still choosing preferences, so that the actual connection time is reduced, possibly to near zero, once the user actually takes the final step of choosing "join meeting." A flow diagram of the steps involved in preheating the meeting in one implementation is shown in FIG. 3.

Figure 3:
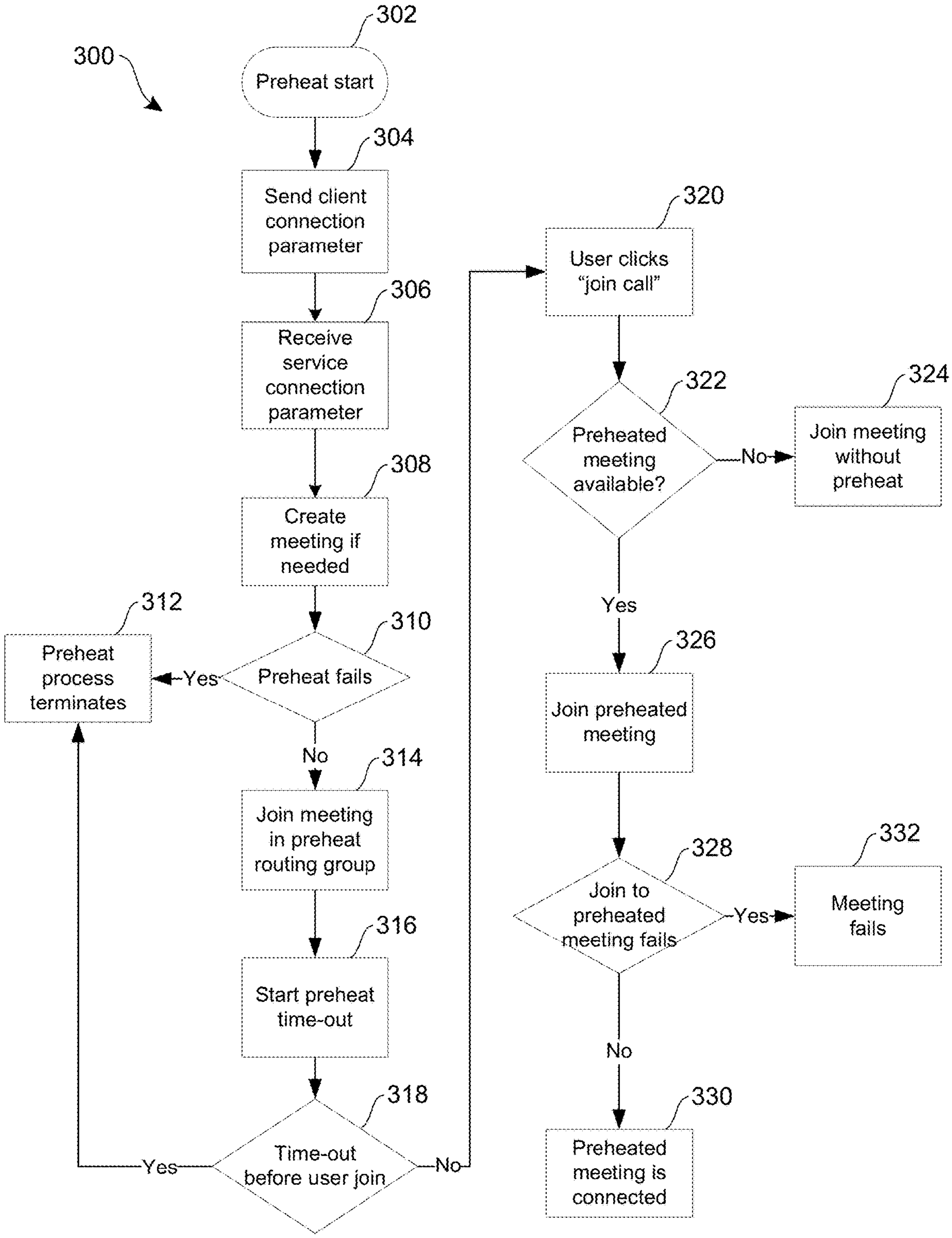
FIG. 3 is a flow chart showing steps of preparing a meeting.

As shown in FIG. 3, the preparation process 300 starts when the user navigates to the user interface 200, indicating an intention to join a meeting (step 302), and the user's computer sends a client connection parameter to an online meeting service (step 304). The client connection parameter includes address information (such as an IP address) and port information for the user's computer, and it may also include a specification of what type of media to exchange as part of the meeting (e.g., audio, video, screen sharing, or text messages) or other information about the meeting being requested. The online meeting service responds with a service connection parameter (step 306), providing similar address and port information for the meeting on the service, and if applicable, confirming that the type of media requested to be exchanged is acceptable. If the user is starting a new meeting (rather than joining one in progress), the online meeting service creates it (step 308), which may occur before, after, or concurrently with sending the service connection parameter to the user's computer, as long as the content of the service connection parameter is available to send. Creation of the meeting channel or addition of the user may fail (step 310, Yes), in which case the preheating process terminates (step 312). For example, there may be connectivity problems or processor load issues that preclude starting a meeting before the user actually joins it. In some implementations, when the preheating process terminates in this way, the system may try again to "preheat" the meeting, while in other implementations, it is presumed that if the preheat of the meeting failed once, it will probably fail again upon retry, so the system desists.

If the join succeeds (step 310, No), then the computer and/or the remote media service connects the user to the meeting and assigns the user to a "preheat" routing group (step 314). The preheat routing group is a special group where the data channel between the user and the meeting is established and the user is connected to the meeting, but may not receive audio or video from the meeting and is not shown (yet) on the list of meeting participants. After connecting to the meeting in the preheat routing group, the system also starts a preheat time-out countdown for the user to finish joining the meeting (step 316). Because setting up data connections for an online meeting is a resource-intensive process, the existence of a time-out may prevent the system from tying up resources when the user is not planning to join the meeting immediately. The length of the time-out will depend on the specific implementation, but in some implementations, values may be in the range of half a minute to five minutes. For example, a system may use a time-out length of two minutes, three minutes, or four minutes. If the time-out expires before the user chooses to join the meeting (step 318), the preheat process terminates (step 312). If the preheat terminates but the user later does join the meeting, the system sends a new client and server connection parameters after the user chooses the "join meeting" action.

If the user does click button 204 to join the meeting (step 320), the system checks to see if a preheated meeting is available (step 322). If setting up the meeting has failed at an earlier step (for example at step 310 or at step 318), then no preheated meeting will be available (step 322, No), and the system will join the meeting according to the "normal" method without preheating (step 324); no special routing group will be used, and the user will have to wait for client and server connection parameters to be exchanged to establish the data channel. Otherwise (step 322, Yes), the user is joined to the preheated meeting (step 326). The preheat process may have already been completed, so that the preheated meeting may be ready for the user to join almost immediately, or it may still be in the process of being set up. If preheating the meeting is not complete, the computer will wait until the meeting is preheated before joining the user to it (leaving the user in the "preheat" routing group until the data channel is ready), which may result in some wait time for the user, but this wait time will typically be less than for a meeting which only begins the connection process after the user selects "join meeting." This step may also fail (step 328). As shown in FIG. 3, if the computer or the online meeting service is unable to connect the user to the meeting at this point, no join occurs and the user is notified that he cannot connect to the meeting at this time (step 332). Since setting up and joining online meetings is a computationally intensive task, the system may be designed not to re-try adding the user to the meeting automatically. In the other implementations, if the join to the preheated (or preheating) meeting fails, the computer and media service may exchange client and server connection parameters again to try to connect the meeting without using the preheat process. If the join to this preheated meeting does not fail, then when the meeting fully preheated, the user is connected (step 330). As a last part of step 330, the user is placed in the main routing group, and if appropriate, audio and video are turned on in accordance with the settings in dialog 202, so that the user may interact with anyone else who is already in the meeting. While the process described above in connection with FIG. 3 may not always reduce the actual amount of time that it takes for a user to join an online meeting, the time perceived by the user may be significantly shorter, because time spent selecting settings is also being used by the back end of the system to start the connection process.

Because creating and joining an online meeting can be computationally intensive, in the implementation shown in FIG. 3, there are a number of points where preheating does not continue if a step fails. The illustrated flow presumes that if the preheat process fails the first time, any subsequent try is also likely to fail, so it does not attempt to create a preheated meeting again. In other implementations, the system may restart the preheat process to try again to join the user to the meeting in preheat mode. As described above, the preheat process may also be discontinued if the user takes too long to attempt to join the meeting, or if the user navigates away from UI 200, because it is presumed that the user is not actually about to join the meeting. If the user returns to UI 200 after leaving, the process shown in FIG. 3 may start over again. In other implementations, the preheated meeting may be "held" for a period of time even if the user navigates away from UI 200. This period of time may be predetermined in advance or it may be dynamically determined based on the system resources available, and it may be the same as the preheat time-out mentioned above, or it may be a different length of time.

Figure 4:
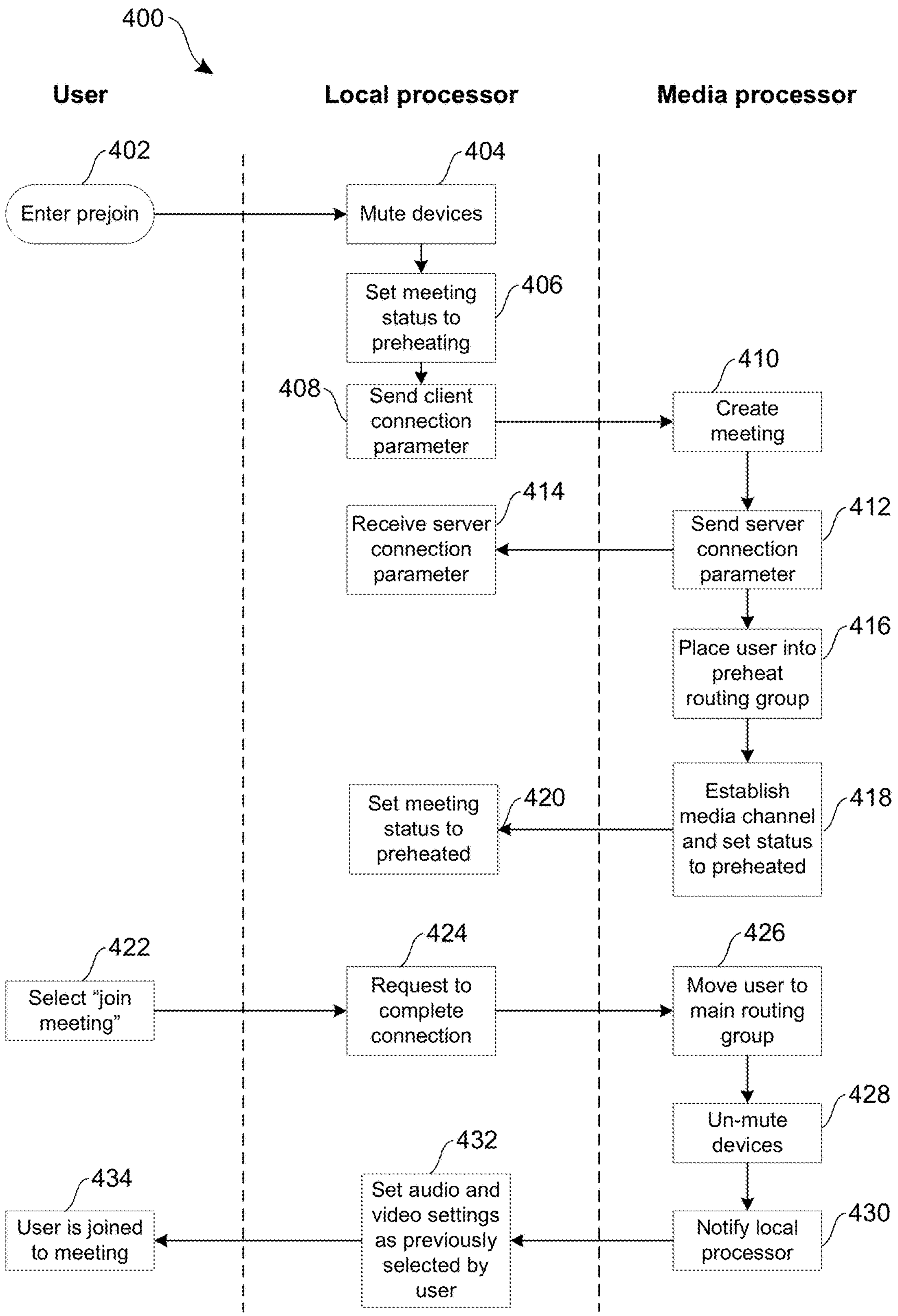
FIG. 4 shows signaling between the user, the user's local processor, and a remote media processor.

FIG. 4 is a flow diagram 400 showing signals that pass between the user, a local processor (which may also be described as a client processor or a client computer), and a media processor (which may also be described as a conversation service or media service). As described above, the user starts the process by entering pre-meeting dialog 202 (step 402), which may be accessible as part of starting an online meeting through a meeting client, such as MICROSOFT TEAMS®, ZOOM®, or SKYPE®. The local processor may recognize that the user may be about to start a meeting and may mute devices locally if they are not already muted (step 404). Muting devices (e.g., microphone or video) provides additional security that the user's audio will not "leak" into the meeting before the user is fully joined for participation in the meeting.

The local processor sets the user's meeting status to "preheating" (step 406) and sends a client connection parameter to the media processor for the meeting (step 408). The client connection parameter includes the client address (such as IP address) and port information, and may also include other information such as media types or other parties to the meeting. In response, the media processor creates the meeting (if it does not already exist) (step 410) by allocating address (es) and port(s) and optionally by specifying meeting participants and media types, and it sends a server connection parameter to the local processor (step 412), whether the meeting is preexisting or newly created. The server connection parameter is received at the local processor (step 414), which keeps the meeting status as "preheating" and waits for further instructions. When placing the user in the meeting, the media processor may place the user in a "preheat" routing group (step 416), where no media flows between them and the rest of the meeting. The user also may not appear in the meeting roster while in the preheat routing group (even to their own devices).

The local processor receives the server connection parameter (step 414), keeping the meeting description flag as "preheating" (step 416). If the exchange of the client and server parameters is complete before the user indicates readiness to join the meeting, the media processor completes the connection, setting meeting description flags to "preheated" (step 418), but may leave the user in the "preheat" routing group, not yet putting the user into the meeting roster or allowing media to flow between the user and the meeting. It signals the local processor, which may also set the meeting status to "preheated" (step 420) but also may not yet un-mute the devices. In the illustrated implementation, the flow of information between a user and a meeting during preparation is suppressed at both the local processor (by muting devices in step 404) and at the media processor (by placing the user in the preparation routing group in step 416), but some implementations may use only one (or neither) of these two steps. None of steps 404-420 may normally be visible to the user, who is still interacting with the prejoin dialog 202 in the meeting client at this point in the process.

Continuing on through FIG. 4, the user uses UI 200 to join the meeting (step 422). As mentioned above, this step may be accomplished by clicking on a user control 204, or by a voice prompt or other appropriate input means. The local processor then transmits a request to complete the meeting connection to the media processor (step 424). If the call is already preheated (that is, the communication channel for the meeting has been established), the media processor moves the user into the main routing group for the meeting (step 426), un-mutes their devices (step 428), and notifies the local processor that this step is complete (step 430). Moving the user from the preheat routing group to the main routing group also may cause them to appear in the meeting roster. It will be understood that these steps may not always occur in the listed order. If the process of establishing a connection is not yet complete (i.e., client and server connection parameters have not yet been exchanged), the media processor completes it before performing steps 426-430. The local processor may set whatever audio and video settings were selected by the user as part of UI 200, for example unmuting the microphone and/or allowing video to flow if appropriate (step 432). The user sees that he is now joined to the meeting (step 434). Media may now flow in both directions between the user and other meeting participants. Not shown in FIG. 4, if the user enters a different meeting or navigates away from or dismisses the meeting prejoin dialog 202 before being joined to the meeting, the connection that was being prepared for him may be dismissed. The steps of the joining process that may be visible to the user are steps 402 (the user enters the prejoin UI), 422 (the user chooses to join the meeting), and 434 (the user is connected to the meeting). The time to join the meeting from step 402 to step 434 may be similar to the time between steps 422 and 434 when the invention is not used, but the join may "feel" faster to the user because it is started earlier in the process, providing the technical benefit that joining may be faster (in some implementations, almost immediate) and less frustrating when the user chooses "join meeting."

In some implementations, the process shown in FIG. 4 may include additional steps to support other meeting functionalities. For example, the media processor may establish an "observing call" parallel to the meeting being joined, which monitors how many users are connected to a meeting. This observing call may be used to automatically mute new users entering large meetings (for example, meetings having more than five users), so that the sounds of entering users do not disrupt the meeting. The architecture shown in FIG. 4 may readily accept such additional features of the media processor. In the implementations shown, the preparation process is not used when a user enters a meeting via a notification (e.g., one sent by others already in the meeting), but in other implementations the media processor may prepare a meeting at the time that the notification is sent to facilitate rapid addition of the user to the meeting.

The implementations described above in connection with FIG. 3 and FIG. 4 begin with a user entering a prejoin dialog, but other beginnings are also possible in other implementations. For example, in one implementation, the local processor may be monitoring a user's calendar and may request that a meeting be prepared a few minutes before the meeting is due to begin, so that the user may join the meeting with minimal waiting when it is time. An AI may also recognize that a meeting is imminent by monitoring messages sent to and from the user, such as emails or text messages, and instruct the media processor to being preparing a meeting (step 408). An organization may have conference rooms equipped for online meetings (for example with cameras, microphones, speakers, and/or displays), in which case the media processor may begin to prepare a meeting in response to an imminent meeting on the conference room calendar, or in response to a person entering the room (presumably in order to have a meeting there).

Figure 5:
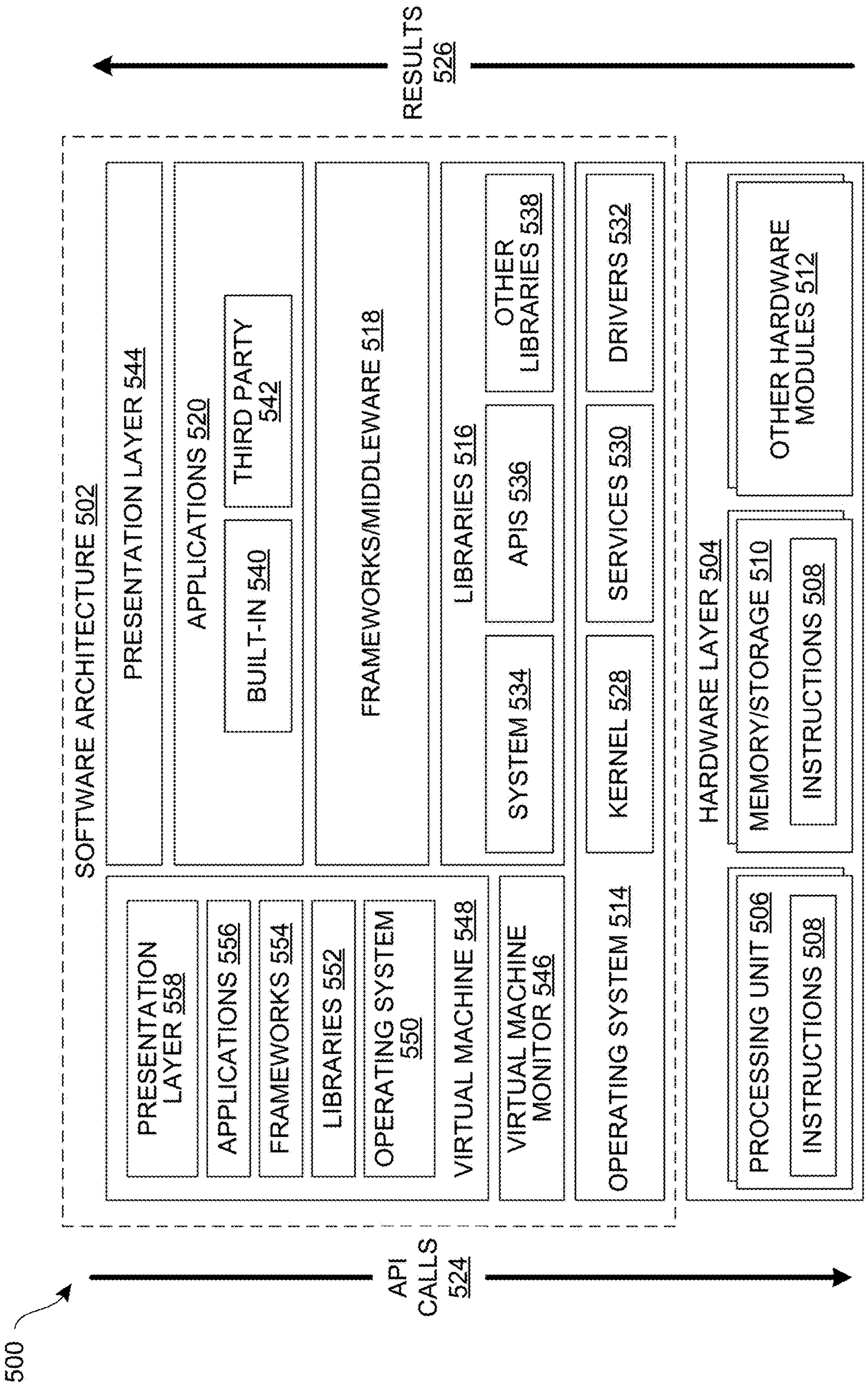
FIG. 5 is a block diagram of an example computing device, which may be used to provide implementations of the systems and methods described herein.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as the data processing system running the methods of FIG. 3 or FIG. 4 that may include, among other things, document storage, processors, memory, and input/output (I/O) components. A representative hardware layer 504 is illustrated and can represent, for example, the devices described herein. The representative hardware layer 504 includes a processing unit 506 and associated executable instructions 508. The executable instructions 508 represent executable instructions of the software architecture 502, including implementation of the methods, modules and so forth described herein. The hardware layer 504 also includes a memory/storage 510, which also includes the executable instructions 508 and accompanying data. The hardware layer 504 may also include other hardware modules 512. Instructions 508 held by processing unit 508 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular platform. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine. The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
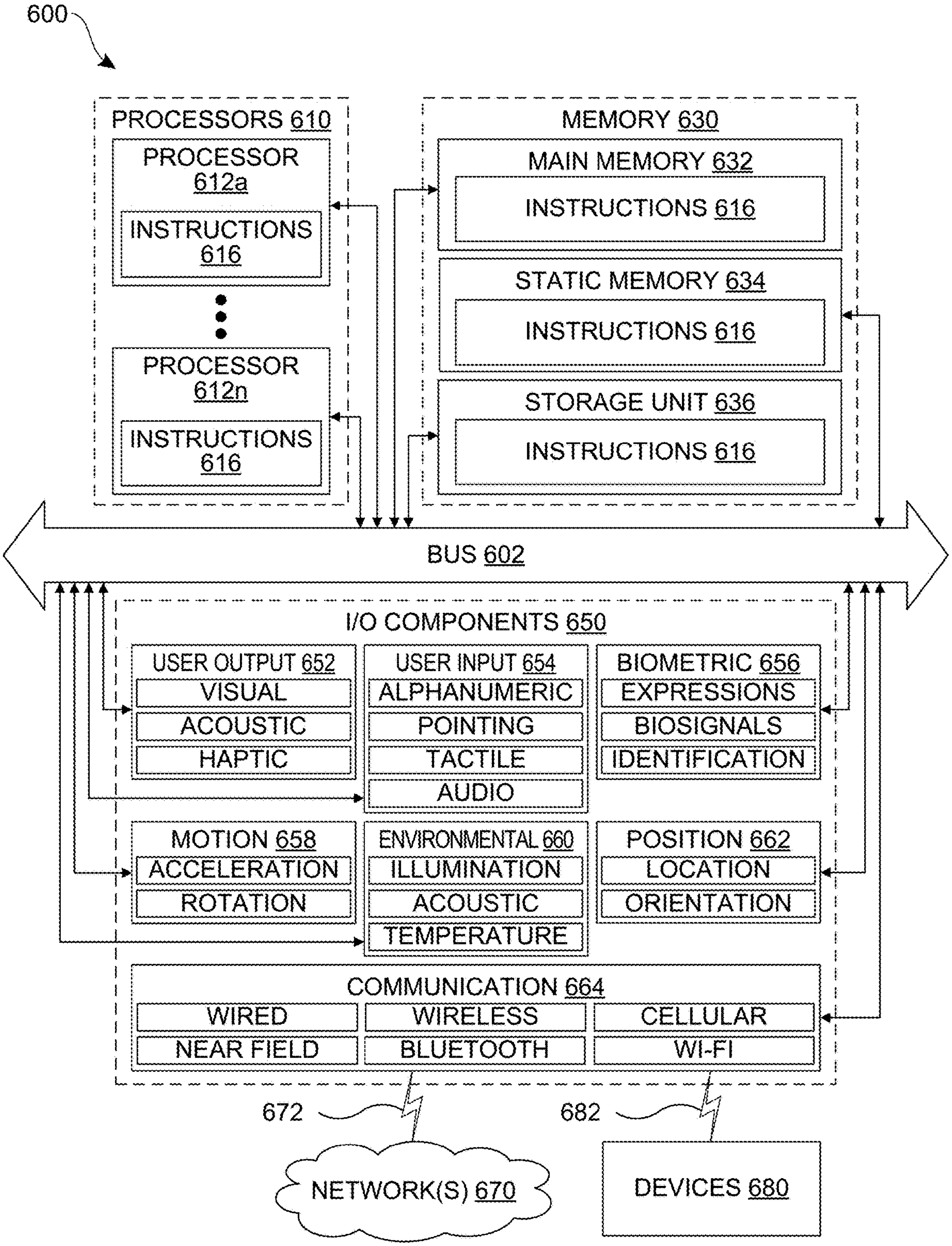
FIG. 6 is a block diagram illustrating components of an example machine configured to read instructions from a machine-readable medium.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement modules or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612*a* to 612*n* that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers).

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

In the following, further features, characteristics and advantages of the invention will be described by means of items:

Item 1: An online meeting system, including a processor and machine-readable media including instructions. The instructions, when executed by the processor, cause the processor to receive a request from a client computer to join an online meeting; in response to the received request, cause the client computer to display a user interface (UI) on a display, the UI including a settings dialog configured to select at least one setting for the online meeting and a selectable icon which, when activated, is configured to receive at the processor the selected at least one setting for the online meeting; prior to receiving an indication that the selectable icon has been activated, receive a client connection parameter from the client computer, the client connection parameter including address information and a port identifier for the client computer; in response to receiving the client connection parameter, send a processor connection parameter to the client computer, the processor connection parameter including address information and a port identifier for the processor, thereby establishing a data communication channel for the online meeting between the client computer and the processor; and in response to receiving the indication that the selectable icon has been activated, connect the client computer to the online meeting using the established data communications channel with the selected setting.

Item 2: The online meeting system of Item 1, wherein the client connection parameter further includes an identifier of at least one media type.

Item 3: The online meeting system of Item 1 or 2, wherein the at least one media type is selected from the group consisting of audio, video, text messages, and screen sharing.

Item 4: The online meeting system of any of Items 1-3, wherein to send the processor connection parameter to the client computer, the machine-readable media further include instructions which, when executed by the processor, cause the processor to create the online meeting on an online meeting server.

Item 5: The online meeting system of any of Items 1-4, wherein to send the processor connection parameter to the client computer, the machine-readable media further include instructions which, when executed by the processor, cause the processor to identify an existing online meeting for the client computer to join.

Item 6: The online meeting system of any of Items 1-5, wherein the machine-readable media further include instructions which, when executed by the processor, cause the processor to prevent communications in the online meeting from being sent to the client computer before the selectable icon has been activated.

Item 7: The online meeting system of any of Items 1-6, wherein the machine-readable media further include instructions which, when executed by the processor, cause the processor to prevent other users already connected to the online meeting from receiving communications from the client computer until after the selectable icon has been activated.

Item 8: The online meeting system of any of Items 1-7, wherein the setting for joining the online meeting includes at least one setting selected from the group consisting of whether to send audio, whether to send video, a user display name, a user audio device, a user video device, a user microphone device, audio muting settings, video blur settings, and video backdrop settings.

Item 9: The online meeting system of any of Items 1-8, wherein the machine-readable media further include instructions which, when executed by the processor, cause the processor to dismiss the established data channel if the selectable join icon has not been activated within a selected amount of time, the UI is dismissed on the client computer, or the client computer is connected to a different online meeting.

Item 10: A method for establishing an online meeting on a media server, the method including receiving a request from a client computer to join an online meeting; in response to the received request, directing the client computer to cause a user interface (UI) to be displayed on a display, the UI including a settings dialog configured to select at least one setting for the online meeting, and a selectable icon which, when activated, is configured to receive at the processor the selected at least one setting for the online meeting; prior to receiving an indication that the selectable icon has been activated, receiving a client connection parameter from the client computer, the client connection parameter including address information and a port identifier for the client computer; in response to receiving the client connection parameter, sending a processor connection parameter to the client computer, the processor connection parameter including address information and a port identifier for the processor, thereby establishing a data communication channel for the online meeting between the client computer and the processor; and in response to receiving the indication that the selectable icon has been activated, connecting the client computer to the online meeting using the established data communication channel with the chosen setting.

Item 11: The method of Item 10, wherein the client connection parameter further includes a selection of at least one media type.

Item 12: The method of Item 10 or 11, wherein the at least one media type is selected from the group consisting of audio, video, text messages, and screen sharing.

Item 13: The method of any of Items 10-12, wherein establishing the data connection channel for the online meeting includes preventing communications from the online meeting from being sent to the client computer before the selectable join icon has been activated.

Item 14: The method of any of Items 10-13, wherein establishing the data connection channel for the online meeting includes preventing other users already joined to the online meeting from receiving communications from the client computer until after the selectable join icon has been activated.

Item 15: The method of any of Items 10-14, wherein establishing the data connection channel for the online meeting includes dismissing the established data connection channel if the selectable join icon has not been activated within a selected amount of time, the UI is dismissed on the client computer, or the client computer is connected to a different online meeting.

Item 16: An online meeting service, including a processor and machine readable media including instructions. The instructions, when executed by the processor, cause the processor to determine that an online meeting is expected to occur according to a selected criterion; in response to the determination that the online meeting is expected to occur, send a client connection parameter for the online meeting to a media service, the client connection parameter including address and port information for the processor; in response to sending the client connection parameter, receive a service connection parameter from the media service, the service connection parameter including address and port information for the media service, thereby establishing a data communication channel for the online meeting between the processor and the media service; accept a request from the user to join the online meeting; and in response to the request, connect the user to the established data connection channel.

Item 17: The online meeting service of Item 16, wherein the client connection parameter further includes a selection of at least one media type.

Item 18: The online meeting service of Item 16 or 17, wherein the selected criterion is selected from the group consisting of receiving a request to create an online meeting, identifying an online meeting on a user calendar, identifying an online meeting on a conference room calendar, and detecting a user entering an online meeting-equipped conference room.

Item 19: The online meeting service of any of Items 16-18, wherein the machine readable media further includes instructions which, when executed by the processor, cause the processor to present a user interface (UI) to the user, wherein the UI permits the user to select online meeting settings.

Item 20: The online meeting service of any of Items 16-19, wherein the UI includes a selectable join icon, and wherein the machine readable media further includes instructions which, when executed by the processor, cause the processor to send the client connection parameter before receiving an indication that the user has selected the selectable join icon.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. An online meeting system having a two-phase connection process for an online meeting, the two-phase connection process including (i) a pre-meeting phase during which a data communication channel is established for the online meeting and there is no flow of audio or video data for the online meeting through the data communication channel, the pre-meeting phase being initiated in response to a pre-meeting signal, and (ii) a meeting established phase during a flow of audio and/or video data for the meeting is enabled, the online meeting system, the meeting established phase being initiated in response to receiving a join signal, the online meeting system comprising:

a processor; and a memory in communication with the processor, the memory comprising executable instructions that, when executed by the processor alone or in combination with other processors, cause the online meeting system to perform acts of:

receiving a client pre-meeting signal from an online meeting application being executed on a client computer, the client computer being associated with a first user, the client pre-meeting signal including at least one client connection parameter for an online meeting service to use in establishing the data communication channel with the online meeting application for the online meeting;

in response to receiving the client pre-meeting signal and prior to receiving a join signal from the online meeting application indicating that the first user has selected a join meeting control in the online meeting application:

sending a service pre-meeting signal to the online meeting application, the service pre-meeting signal including at least one service connection parameter for the online meeting application to use in establishing the data communication channel with the online meeting service for the online meeting;

establishing, using the at least one client connection parameter and the at least one service connection parameter, the data communication channel for transmitting audio and video data for the online meeting to or from the online application; and after the data communication channel has been established, suppressing flow of information via the data communication channel; and in response to receiving the join signal after the data communication channel has been established, enabling transmission of the audio and video data for the online meeting to and from the online application via the data communication channel.

2. The online meeting system of claim 1, wherein the at least one client connection parameter and the at least one service connection parameter each include address information and port information to use in establishing the data communication channel with the online meeting application and the online meeting service, respectively.

3. The online meeting system of claim 2, wherein the address information comprises an IP address.

4. The online meeting system of claim 2, wherein the at least one client connection parameter and/or the at least one service connection parameter includes a specification of a type of media to be exchanged via the data communication channel for the online meeting.

5. The online meeting system of claim 4, wherein the specification of the type of media includes at least one of audio, video, screen sharing, and text messages.

6. The online meeting system of claim 1, wherein the functions further comprise:

prior to receiving the join signal and after the data communication channel has been established, sending a preheated meeting established signal to the online meeting application, the preheated meeting established signal indicating that the data communication channel has been established successfully and that transmission of the audio and video data to and from the online meeting application for the online meeting is currently being prevented.

7. The online meeting system of claim 1, wherein the functions further comprise:

prior to receiving the join signal and after the data communication channel has been established:

determining an amount of time that has passed since the data communication channel was established; and when the amount of time exceeds a predetermined threshold condition, terminating the data communication channel.

8. The online meeting system of claim 1, wherein the transmission of audio and/or video data for the online meeting is prevented after the data communication channel has been established and prior to receiving the join signal.

9. The online meeting system of claim 1, wherein the functions further comprise:

in response to receiving the join signal after the data communication channel has been established, sending a connection established signal to the online meeting application, the connection established signal indicating that the data communication channel is established and that the transmission of the audio and video data to and from the online meeting application for the online meeting is enabled.

10. An online meeting system having a two-phase connection process for an online meeting, the two-phase connection process including (i) a pre-meeting phase during which a data communication channel is established for the online meeting and there is no flow of audio or video data for the online meeting through the data communication channel, the pre-meeting phase being initiated in response to a pre-meeting signal, and (ii) a meeting established phase during a flow of audio and/or video data for the meeting is enabled, the online meeting system, the meeting established phase being initiated in response to receiving a join signal, the online meeting system comprising:

a processor; and a memory in communication with the processor, the memory comprising executable instructions that, when executed by the processor alone or in combination with other processors, cause the online meeting system to perform functions of:

receiving first user input via a user interface of an online meeting application, the first user input indicating that a user is interacting with settings for an online meeting;

receiving second user input via the user interface indicating that the user has selected a join meeting control of the user interface;

in response to receiving the first user input and prior to receiving the second user input:

sending a client pre-meeting signal to an online meeting service, the client pre-meeting signal including at least one client connection parameter for the online meeting service to use in establishing a data communication channel with the online meeting application for the online meeting;

receiving a service pre-meeting signal from the online meeting service, the service pre-meeting signal including at least one service connection parameter for the online meeting application to use in establishing the data communication channel with the online meeting service for the online meeting;

receiving a preheated meeting established signal indicating that the data communication channel has been established successfully; and suppressing flow of audio and video data from the online meeting application to the online meeting via the data communication channel;

in response to receiving the second user input after receiving the preheated meeting established signal:

sending a join meeting signal to the online meeting service;

receiving a connection established signal from the online meeting application, the connection established signal indicating that the data communication channel is established; and in response to receiving the connection established signal, enabling transmission of the audio and video data from the online meeting application to the online meeting via the data communication channel.

11. The online meeting system of claim 10, wherein the at least one client connection parameter and the at least one service connection parameter each include address and port information to use in establishing the data communication channel with the online meeting application and the online meeting service, respectively.

12. The online meeting system of claim 10, wherein:

the user interface comprises a settings dialog having at least one setting control for selecting at least one setting for the online meeting, and the first user input is indicative of the user interacting with the at least one setting control.

13. The online meeting system of claim 10, wherein:

the user interface comprises a contact selection control for selecting contacts to participate in the online meeting, and the first user input is indicative of the user selecting at least one contact to participate in the online meeting via the contact selection control.

14. The online meeting system of claim 10, wherein:

the user interface comprises a contact selection control for selecting contacts to participate in the online meeting, and the first user input is indicative of the user selecting at least one contact to participate in the online meeting via the contact selection control.

15. The online meeting system of claim 10, wherein the online meeting application comprises at least one of a contacts application, a browser application, a location application, a media application, a messaging application, and a game application.

* * * * *